Aug. 24, 1965
A. J. LEWUS
3,202,896
THREE PHASE TO SINGLE PHASE CONVERTER SYSTEMS
Filed June 22, 1964
2 Sheets-Sheet 1
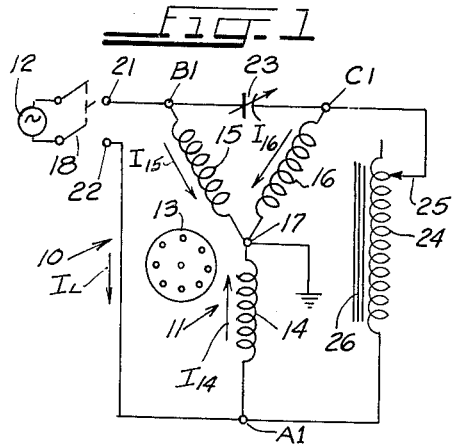
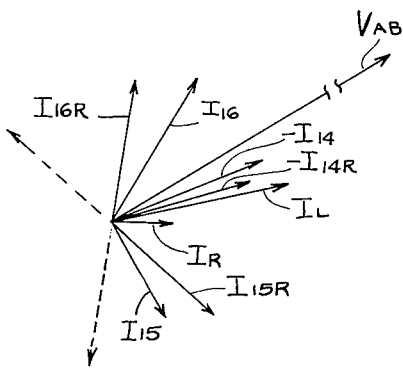
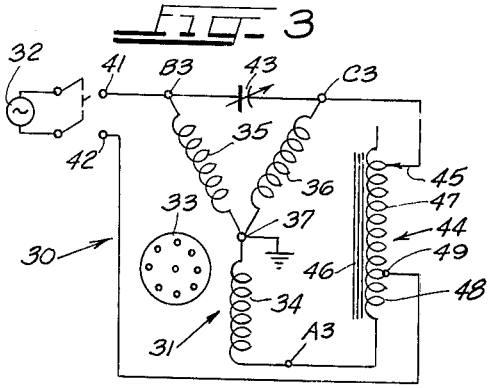
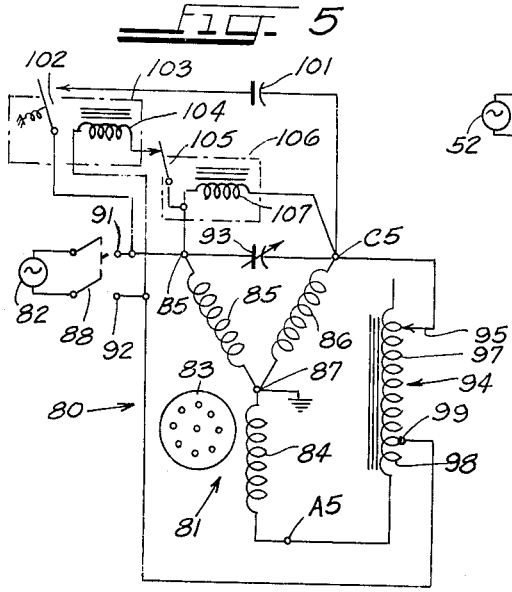
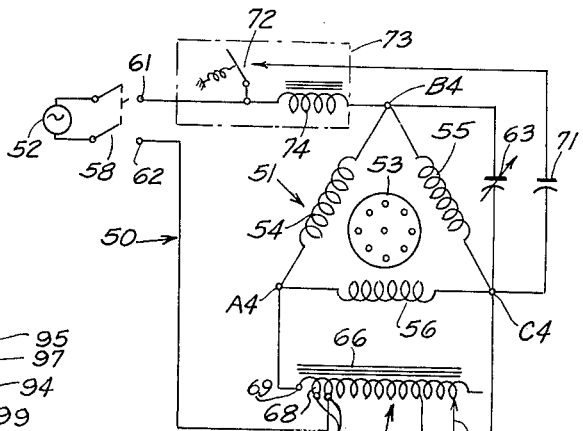
INVENTOR.
ALEXANDER J. LEWUS
BY
Wallace, Kinzer & Horn
ATTYS.

Aug. 24, 1965   A. J. LEWUS   3,202,896
THREE PHASE TO SINGLE PHASE CONVERTER SYSTEMS
Filed June 22, 1964   2 Sheets-Sheet 2
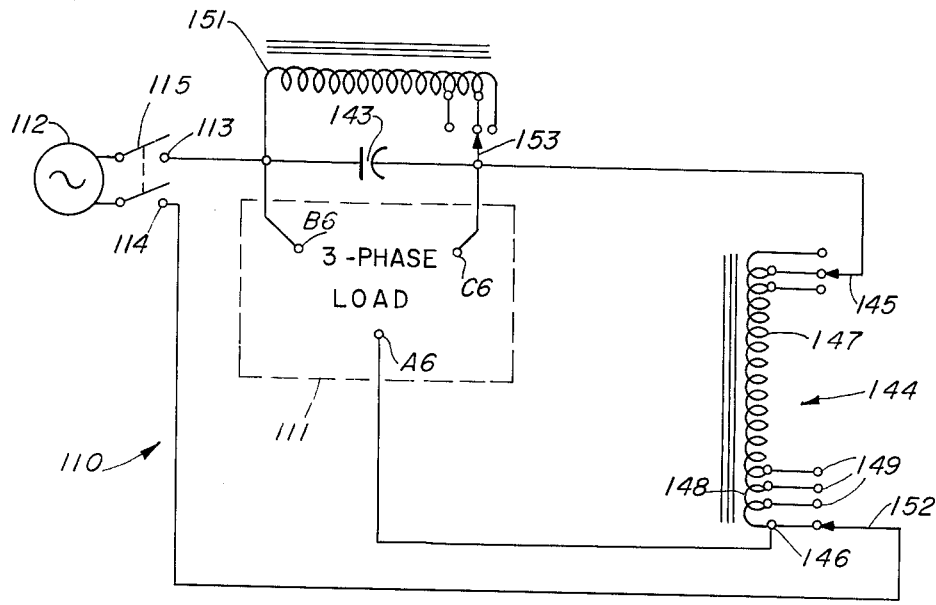
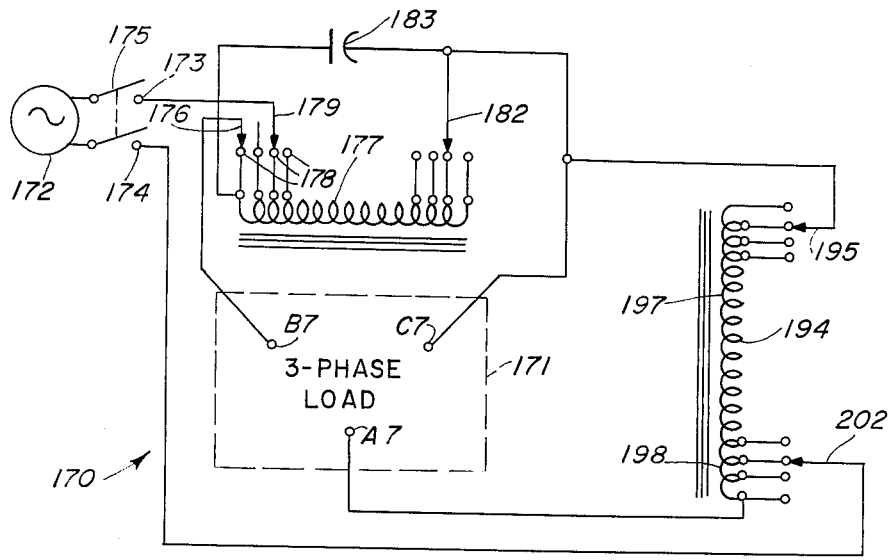
INVENTOR.
ALEXANDER J. LEWUS
BY
Wallace, Kinzer and Dorn
ATTYS.

United States Patent Office 3,202,896
Patented Aug. 24, 1965

3,202,896
THREE PHASE TO SINGLE PHASE CONVERTER SYSTEMS
Alexander J. Lewus, 1617 S. 47th Court, Cicero, Ill.
Filed June 22, 1964, Ser. No. 379,763
14 Claims. (Cl. 318—218)

This invention relates to converter systems and particularly to new and improved converter systems for energizing a three-phase motor from a single-phase power supply.

This application is a continuation-in-part of application Serial No. 127,772, filed June 14, 1961, now abandoned.

There are numerous applications in which it is necessary or desirable to utilize three-phase motors in the operation of different kinds of equipment without requiring provision of a three-phase power supply. The usual practice, under these circumstances, has been to employ a series capacitor in a relatively simple converter circuit. That is, two of the input terminals of three-phase motor are connected directly to a single-phase power supply and the third input terminal of the motor is connected to one of the input lines through a relatively large high-voltage capacitor. A converter circuit of this kind, while relatively inexpensive, has several disadvantages in operation. For example, it can be shown that the currents in the three phases of a conventional motor can be balanced only for a power factor of 0.5, a condition that can be achieved, in most instances, only when the motor is very lightly loaded. Furthermore, the breakdown torque and starting torque for the motor are quite low with a conventional capacitor conversion circuit of this kind.

A variety of other proposals have previously been advanced for the construction of conversion systems for operating three-phase motors from single-phase sources. For example, one modification of the series-capacitor converter described above incorporates an autotransformer in the converter in an arrangement that permits balancing of the motor circuit for virtually any desired load. In general, however, systems of this kind are balanced only for one particular load and, if balanced for approximately normal full load conditions for the motor, do not provide breakdown and starting torques comparable to those afforded by the three-phase motor on normal operation from a three-phase source.

It is a principal object of the present invention, therefore, to provide a new and improved converter system for energizing a three-phase motor from a single-phase power supply.

A particular object of the invention is to attain relatively high breakdown and pull-in torques, comparable to those achieved in normal three-phase operation, in a converter system employed to operate a three-phase motor from a single phase power supply.

Another object of the invention is to achieve relatively high efficiency under overload conditions in a single-phase converter system used to drive a three-phase motor.

A particular object of the invention is to provide balanced three-phase voltages and currents, in a converter system for operating a three-phase motor from a single-phase power supply, using a low cost circuit arrangement that permits the utilization of low-voltage capacitors and of inductive reactors having relatively low losses.

An additional object of the invention is to attain superior flexibility, in a converter system for energizing three-phase motors from a single-phase power supply, by utilization of a circuit providing for either heavy or moderate starting conditions, or both, without circuit change.

Thus, the present invention is directed to a converter system for energizing a three-phase motor or other three-phase load, having three input terminals referred to herein as terminals A, B and C, from a two-terminal single-phase power supply. A converter system constructed in accordance with the invention comprises first connecting means employed to connect one of the power supply terminals to the motor terminal B. A low-voltage dephasing capacitor is connected between the motor terminals B and C. An iron-core autotransformer having first and second winding sections connected together at a center terminal is included in the circuit, the end terminals of the first and second winding sections being connected, respectively, to motor terminals C and A. The first winding section of the autotransformer is constructed to have a substantially higher inductive reactance than the second winding section. Further, means are provided for connecting the central terminal of the autotransformer to the remaining power supply output terminal.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be as desired by those skilled in the art without departing from the present invention.

In the drawings:

FIG. 1 is a schematic diagram of a converter system, illustrating general principles employed in the present invention;

FIG. 2 is a vector diagram employed to explain certain relationships in the circuit of FIG. 1;

FIG. 3 is a schematic diagram of a converter system constructed in accordance with one embodiment of the present invention;

FIG. 4 illustrates another embodiment of the invention, similar to FIG. 3, but including a separate starting capacitor and showing the application of the invention to a motor using a different field winding arrangement than the motors of FIGS. 1 and 3;

FIG. 5 illustrates another embodiment of the invention, generally similar to FIG. 4 but incorporating a different control circuit for the starting capacitor;

FIG. 6 illustrates an additional embodiment of the invention in which an inductance is connected in parallel with the de-phasing capacitor of the system; and FIG. 7 illustrates a converter system similar to FIG. 6 but employing a different circuit arrangement for the parallel inductance to permit effective adjustment to a wide range of line voltages.

The principles upon which the present invention is based are illustrated in part by the converter system 10 shown in FIG. 1. The system 10 comprises a converter for energizing a three-phase motor 11 from a single-phase power supply 12. The motor 11 may be of conventional construction and comprises a rotor 13 which may be of the squirrel-cage, synchronous, or wound-rotor type. Regardless of the type of motor, it includes suitable field windings 14, 15 and 16 which, as shown, are Y-connected. That is, the field windings 14 through 16 each have one end connected to a common terminal 17, which may be grounded, as shown, if desired. The motor 11 thus has three input terminals, the input terminals for the field windings 14, 15 and 16 being designated by the reference characters A1, B1 and C1 respectively. As will be apparent from the following description, the system may be used with other three-phase loads as well as with a three-phase motor.

The single-phase power supply 12, as illustrated in FIG. 1, includes a conventional double-pole single-throw switch 18 having output terminals 21 and 22, referred to hereinafter as the output terminals of the power supply. The first output terminal 21 is directly connected to the input terminal B1 of the motor 11. Similarly, the second power supply output terminal 22 is directly connected to the motor terminal A1, in this embodiment of the invention. An adjustable de-phasing capacitor 23 is connected between the motor terminals B1 and C1, affording a means for supplying operating current to the field winding 16 of the motor 11. Preferably, the capacitance 23 comprises a plurality of individual capacitor sections and tap means for connecting them into the circuit on a selective basis.

As thus far described, the conversion system 10 corresponds to conventional capacitor converter circuits of the kind referred to hereinabove. For purposes of comparison with the complete conversion system 10, as described in greater detail hereinafter, it is desirable to consider the current relations in the three different phases of the field windings of the motor 11. For this purpose, reference may be made to FIG. 2, which includes a vector diagram showing the individual phase currents.

As shown in FIG. 2, the current $I_{14}$ through the field coil 14 is displaced only by a small phase angle from the line voltage designated in the vector diagram as $V_{AB}$. The current $I_{15}$ in the coil 15 for the second phase of the motor is displaced almost 90° from the current $I_{14}$ of the first phase and, moreover, is of substantially smaller amplitude. The current $I_{16}$ in the third field coil 16 of the motor 11 is of slightly greater amplitude than the current $I_{14}$ and is displaced in phase, with respect to the current $I_{14}$ by an angle substantially different than that between the currents $I_{14}$ and $I_{15}$. Of course, the two currents $I_{15}$ and $I_{16}$, added vectorially, are equal in amplitude to the current $I_{14}$. It is thus seen that the currents in the three field windings of the motor 11 are not balanced with respect to amplitude or phase, and this is the normal condition in a conventional capacitor converter circuit of the kind utilizing only a capacitor such as the condenser 23 to permit operation of a three-phase motor from a single-phase supply.

The converter system 10 of FIG. 1, however, further includes a current-balancing reactor 24 that is connected in parallel with the motor terminals A1 and C1; that is, the reactor 24 is connected across the terminals A1 and C1 in parallel with the motor windings. The inductive reactor 24 is an iron core device having one terminal directly connected to the motor terminal A1. An adjustable tap 25 is provided on the reactor 24, and this tap is connected to the motor terminal C1. The reactor 24 should have a relatively high reactance/resistance ratio and is preferably operated near the saturation level of the core 26. On the other hand, the windings of the reactor 24 may be of relatively small wire, since the reactor is not required to carry the main operating current of the motor. The reactor 24 should be operated to afford lagging current displaced as close to 90° from the voltage across the reactor as possible; phase angles of 75° to 85° can be readily obtained. Preferably, the core 26 is fabricated from standard grade sheet steel laminations or higher permeability materials stacked together in butt-jointed manner or having a small air gap that may be adjusted to obtain optimum motor performance to afford a minimum heat loss.

The effect of incorporation of the reactor 24 in the converter circuit 10 can best be understood with reference to the vector diagram of FIG. 2. In the vector diagram the reactor current is indicated by the vector $I_R$. This current, of course, affects each of the phase currents $I_{14}$, $I_{15}$ and $I_{16}$, and also affects the line current drawn by the motor 11. Thus, the current in the second phase comprising the winding 15 of the motor is now represented by the vector $I_{15R}$, obtained by addition of the vector current $I_R$ to the vector current $I_{15}$. By the same token, the current in the motor winding 16 is changed by vectorially subtracting the current $I_R$ from the current $I_{16}$, the corrected current for the phase winding 16 being shown in FIG. 2 by the vector $I_{16R}$. The current through the coil 14 must still represent the sum of the currents in the coils 15 and 16, and is shown by the vector $I_{14R}$. Before, the line current was the same as the current through the coil 14. This is no longer true, however, and the total line current $I_L$ is now the vector sum of the reactor current $I_R$ and the current $I_{14R}$ through the winding 14.

From the vector diagram of FIG. 2, it can be seen that the incorporation of the reactor 24 in the converter circuit 10 of FIG. 1 produces a substantial effect upon the operating characteristics of the converter. Thus, the currents in the three phases of the motor field winding are now balanced, being approximately equal to each other. By adjusting the inductor tap 25, the air gap of the core 26, or the taps of capacitor 23, an effective balance can be achieved at virtually any desired condition of motor load, affording phase currents that are equal to each other within plus or minus two to five percent. Furthermore, the phase relation between the phase currents in the motor is greatly improved. Thus, with the reactor 24 incorporated in the converter circuit, the phase angle between the currents in the coils 14 and 16 is increased to approximately 60° and the phase angle between the currents in the coils 14 and 15 is decreased to approximately 60°. These phase conditions are directly analogous to those afforded by a conventional three-phase power supply, with the phase currents displaced at 120° as indicated by the dash line vectors in FIG. 2. That is, the cosine of the phase angles of 60° produced with the converter system 10 of FIG. 1 is the same as the cosine of the 120° phase angles afforded by a conventional three-phase power supply, so that the motor 11 operates in esssentially the same manner as if it were connected to a balanced three-phase supply.

Because the reactor 24 is effectively connected in parallel with the motor windings, it does not carry a major share of the motor operating current. Consequently, the losses in the reactor are relatively small and it does not adversely affect efficiency of the motor 11 to any substantial extent. It can be demonstrated that the voltage across the capacitor 23, in the illustrated system, is approximately the same as or only slightly higher than the line voltage at terminals 21 and 22.. Consequently, the voltage rating of the capacitor can be approximately the normal line voltage. The circuit of FIG. 1 affords relatively high breakdown and pull-in torques, as compared with conventional arrangements using only a series capacitor; in fact, the breakdown and pull-in torques made approximately equal to or greater than the corresponding values achieved when the motor 11 is operated from a conventional three-phase supply.

FIG. 3 illustrates a converter system 30, constructed in accordance with the present invention, that is similar to the system of FIG. 1 but which affords substantially improved operating characteristics as compared therewith. As in FIG. 1, the conversion system is applied to a conventional three-phase Y-connected motor 31 comprising a rotor 33 and three field windings 34, 35, and 36. The common terminal 37 of the windings may be connected to ground, although this is not essential. In this instance, the input terminals of the motor are designated by the reference characters A3, B3 and C3.

The power supply in FIG. 3 is designated by the reference numeral 32 and is provided with a pair of output terminals 41 and 42. The terminal 41 is directly connected to the motor terminal B3 and is connected through an adjustable series capacitor 43 to the motor terminal C3.

In the system 30 of FIG. 3 there is included an iron-core transformer 44 having first and second winding sections 47 and 48 on a core 46. The winding sections 47 and 48 are connected together at a common terminal 49. The end terminal of the first winding section 47 is connected to the motor terminal C3, preferably by means of a variable tap 45. The second winding section 48 is connected to the motor terminal A3. The center terminal 49 of the transformer is connected to the second power supply terminal 42.

The construction of the autotransformer 44 is somewhat similar to that of the reactor 24 in FIG. 1. The transformer winding 47 provides the principal reactance for balancing the currents in the motor windings 34–36, and preferably has a much higher inductive reactance than the second winding section 48. The windings 47 and 48 can be constructed from a uniform size wire. However, it should be noted that the winding section 48 is required to carry the full operating current for the motor field winding 34. Consequently, it is usually desirable to construct the transformer winding 48 from a few turns of relatively large wire. On the other hand, the winding section 47 does not carry more than a small fraction of the operating current for the motor and consequently may be constructed with a substantially smaller wire. Of course, there must be a substantially larger number of turns in the winding section 47 to achieve the reactance ratio in the transformer windings noted hereinabove.

In normal operation, the circuit of FIG. 3 functions in a manner similar to that of FIG. 1. That is, the reactance of the autotransformer 44 effectively balances the currents and voltages for the individual field windings of the motor 31, equalizing the currents with respect to amplitude and establishing them at phase angles of approximately 60° relative to each other.

The additional winding section 48 in the embodiment of FIG. 3 affords certain important and advantageous operating features, however, in comparison with the circuit of FIG. 1. In the first place, the transformer winding 48 operates effectively as a bucking coil, particularly at overload conditions, with respect to the single-phase supply voltage. That is, the increase of current in the winding section 48 of the transformer occurring under overload conditions causes a corresponding increase in the flux density in the transformer core 46, tending to neutralize a portion of the total reactance of the transformer 44 with respect to the operating circuit of the field winding 36 for the motor. As a result, the de-phasing effect of the autotransformer remains substantially constant, under overload conditions, permitting operation of the motor under loads that would not be possible with conventional circuits or even with the conversion system of FIG. 1. Moreover, the autotransformer arrangement of FIG. 3 affords better breakdown and starting torques and regulates and balances voltages under overload conditions across each phase better than can be readily achieved with the circuit arrangement of FIG. 1. In FIG. 3, the current in the autotransformer winding section 47 has an effect of de-phasing and controlling motor currents in each phase, while the winding section 48 affects and controls the voltages of each phase and raises and balances the voltages under certain loaded and overloaded motor operating conditions. In FIG. 3, the voltages across the phases are not the same as the single-phase supply; the motor phase voltages can be raised or lowered depending directly upon the turns ratio of winding section 48 relative to section 47.

FIG. 4 illustrates a converter system 50 which is similar to the system 30 of FIG. 3 but which includes certain additional modifications. In this instance, the converter 50 is utilized in connection with a three-phase induction motor 51 comprising a rotor 53 and three field windings 54, 55 and 56. In this instance, however, the field windings of the motor are in a delta connection instead of a Y. That is, the windings 54 and 55 are connected together at the motor terminal B4, the windings 54 and 56 are connected together at terminal A4 and the windings 55 and 56 are connected at the terminal C4.

The converter system 50 works from a single-phase power supply 52 having first and second output terminals 61 and 62. The first power supply terminal 61 is connected to the motor terminal B4. The power supply terminal 61 is also connected through a low-voltage de-phasing capacitor 63 to the motor terminal C4. The second power supply terminal 62 is connected to the motor terminal A4 through a low impedance winding section 68 of an autotransformer reactor 64. The autotransformer reactor 64 includes another winding section 67 that is connected to section 68 and provided with a series of taps 69, the reactor windings being mounted on a common core 66. An adjustable tap 65 is utilized to connect the transformer winding 67 to the motor terminal C4, placing the inductive reactance of the autotransformer in parallel with the motor terminals A4 and C4.

The converter system 50 of FIG. 4 further includes a second de-phasing capacitor 71 that is connected in parallel with the first capacitor 63. The operating circuit for the capacitor 71 includes a pair of normally open contacts 72 in a current-sensitive relay 73. The relay 73 is provided with an operating coil 74 that is connected in series with the line connecting the power supply terminal 61 to the motor terminal B4.

The basic operation of the converter 50 of FIG. 4 is essentially similar to that of the converter 30 of FIG. 3. Under normal operating conditions, the de-phasing capacitor 63 and the autotransformer 64 cooperate to balance the operating currents in the three field windings 54–56 of the motor 51, both with respect to amplitude and phase displacement. Moreover, and also as in embodiment of FIG. 3, the circuit arrangement permits motor operation at overload conditions without substantially changing the balanced current conditions internally of the motor. That is, for a single adjustment of the tap 65, the capacitor 63 and transformer 64 provide essentially balanced operating conditions for the motor over a substantial range of operating currents caused by changes in the load to which the motor 51 is subjected.

The second capacitor 71 is utilized only for starting of the motor 51. Thus, when the switch 58 is first closed to energize the motor, there is a relatively large inrush of current to the motor windings. The total line current flows through the operating coil 74 of the relay 73. As a consequence, under these starting conditions the relay 73 is actuated and closes the contact 72, connecting the second capacitor 71 in parallel with the capacitor 63. As the rotor 53 begins to rotate, however, the current drawn by the motor reduces rapidly. The relay 73 is set to drop out at some predetermined current amplitude substantially smaller than the initial starting current but substantially larger than the normal range of operating current for the motor 51. Thus, the relay 73 affords a means for opening the operating circuit of the capacitor 71 in response to a change of the motor 51 from starting conditions to running conditions and thereby restricts the use of the second capacitor to starting of the motor. That is, relay 73 responds to the inrush of current to motor 51 and completes an operating circuit for the capacitor 71 only when motor 51 is first started.

The use of the auxiliary starting capacitor 71 in the circuit of FIG. 4 makes it possible to increase the current flow to the motor windings 55 and 56, upon starting of the motor, while maintaining the desired phase conditions in the motor windings. In this manner, high starting torques can be obtained without adversely affecting the normal operating conditions of the motor under light or heavy loads. Of course, the same circuit arrangement can be applied to a Y-connected motor to achieve the same results. The conversion system 50 of FIG. 4 does not place an unduly large current capacity on the reactor 64 since at starting the motor windings connected in parallel with the reactor present a much lower impedance than the transformer itself. As before, the relatively short winding 68 of the autotransformer may be constructed with relatively large wire, since this section of the autotransformer must carry the full motor current. Adjustment of tap 65 permits balancing of the voltage of phase A4–C4 relative to the other two phases. Adjustment of the line connection to the end tap 69 is used for light loads, connection to the taps 69 to the right of the end tap being used for heavier load applications.

FIG. 5 illustrates a converter system 80 which combines some of the features of FIGS. 3 and 4 but which utilizes a modified control arrangement for the starting capacitor. Thus, the conversion system 80 is applied to a three-phase motor 81 including a rotor 83 and three field windings 84, 85 and 86. As in FIG. 3, the field windings are connected together at a common terminal 87, which may be grounded. The input terminals to the motor are designated by the reference characters A5, B5 and C5 for the windings 84, 85 and 86 respectively.

The single-phase power supply to which the conversion system 80 is connected is indicated by the reference numeral 82 and is provided with output terminals 91 and 92 and a starting switch 88. The first power supply terminal 91 is connected to the motor terminal B5 and is also connected through a de-phasing low-voltage capacitor 93 to the motor terminal C5. In the conversion system 80, an autotransformer 94 including two windings 97 and 98 is connected across the motor terminals A5 and C5. The center terminal 99 of the autotransformer is connected to the power supply terminal 92. The winding 97 is connected to the motor terminal C5, preferably by means of a variable tap 95. Thus, the principal portion of the conversion system 80 is the same as the system 30 described above in connection with FIG. 3.

The conversion system 80 further includes a second de-phasing capacitor 101 that is connected in parallel with the capacitor 93 in an operating circuit that includes, in series, the normally opened contacts 102 of a control relay 103. The operating coil 104 of the relay 103 is connected across the power supply terminals 91 and 92 in an operating circuit that includes, in series, therewith, a pair of normally closed contacts 105 of a voltage-sensitive relay 106. The operating coil 107 of the relay 106, in turn, is connected across the motor terminals B5 and C5.

Operation of the system 80 of FIG. 5 is generally similar to that of the converter 50 of FIG. 4. That is, the auxiliary capacitor 101 is connected in the operating circuit of the converter 80 only during starting of the motor 81. In this instance, control of the second capacitor circuit is accomplished by detecting the potential rise across the motor terminals that occurs subsequent to starting of the motor. That is, the voltage across the terminals B5 and C5 is relatively low when the switch 88 is first closed to start the motor 81. As the rotor 83 begins to build up speed, however, the voltage across the coil 107 rises. The relay 106 is set to operate at a predetermined voltage substantially higher than the voltage appearing across the motor terminals B5 and C5 upon starting of the motor but well below the voltage reached when the motor is running, even at negligible load. Consequently, after the motor has started but before full speed is reached, the pilot relay 106 is actuated and opens the contacts 105. This breaks the energizing circuit for the operating coil 104 of the relay 103. The relay 103 is, of course, energized when the motor is first started by closing of the switch 88. Once the pilot relay 106 is actuated, however, the operating circuit for the control relay 103 is opened, resulting in the opening of the relay contacts 102. Opening of the contacts 102 breaks the operating circuit for the starting capacitor 101, so that this capacitor is not kept in the circuit during normal operation of the motor. As in the embodiment of FIG. 4, the use of the capacitor 101 provides substantially higher starting torque than could otherwise be realized. On the other hand, the shunt conection of the autotransformer 94, relative to the motor, is such that the autotransformer is not overloaded on starting of the motor.

FIG. 6 illustrates a converter system 110 which embodies the basic principles of the systems described hereinabove, and particularly system 30 of FIG. 3, but which is substantially different in other respects. The converter system 110 is utilized to energize a three-phase operating load 111, which would usually be a three-phase motor, having input terminals A6, B6 and C6, from a single phase power supply indicated generally by the reference numeral 112 and having output terminals 113 and 114. The power supply also includes a suitable starting switch 115. The particular kind of three-phase load that comprises the operating load 111 is not critical. Thus, the load device 111 may be a conventional squirrel-cage induction motor having field windings that are Y-connected or delta-connected, it may be a wound-rotor motor or a synchronous motor, or it may comprise some other three-phase load.

As in the system illustrated in FIG. 3, the first power supply terminal 113 is directly connected to the load terminal B6. Power terminal 113 is also coupled through a series capacitor 143 to the load terminal C6.

The system 110 includes a balancing inductance 144 which may be constructed in the form of an iron core autotransformer. The end terminal 146 of the inductance 144 is directly connected to the load terminal A6. The second power supply terminal 114 is connected to any one of a series of taps 149 distributed along the end of the autotransformer winding 148 immediately adjacent the end terminal 146. In the drawing, the power supply terminal 114 is shown connected to the end terminal 146 but this connection may be adjusted to any of the adjacent taps 149 to balance the system as described more fully hereinafter.

The lower portion 148 of the winding of the inductance 144, which is set off from the upper winding section 147 by the taps 149, has a substantially smaller inductance than the upper section 147. The end of the upper winding section 147 is connected back to the load terminal C6 through an adjustable tap 145.

As thus far described, the circuit 110 of FIG. 6 is essentially similar to the circuit 30 of FIG. 3 except for the adjustable taps 149 on the inductance 144. In the circuit of FIG. 6, however, a further balancing impedance is incorporated in the converter system in the form of an iron core inductance coil 151 that is connected in parallel with the capacitor 143. Preferably, the inductance 151 is relatively large and has an inductive impedance, at the operating frequency of the power supply 112, of the same order as the capacitive impedance of the capacitor 143. That is, the inductance 151 should be large enough so that the circuit comprising the capacitor 143 and the inductance 151 approaches parallel resonance at the operating frequency of the power supply.

As will be apparent from a comparison of the two figures, FIG. 3 and FIG. 6, the basic operation of the converter system 110 is essentially similar to that of the system 30. The system 110, however, affords certain important operating advantages as compared with the system 30. With motor loads or other three-phase loads that exhibit substantial changes in impedance, the system 110 of FIG. 6 remains balanced within acceptable limits over a much wider range of load currents than the system of FIG. 3. Once balanced, the system remains essentially balanced over a wide range of load currents, permitting utilization of the system for supplying a series of motors as the three-phase load 111. When one motor is switched into the circuit or removed, the system does not become unbalanced but continues in a relatively balanced condition. Moreover, the initial inrush currents to the motors during starting do not result in a major imbalance of the system. Operation of the motors or other load devices at normal rated current or under no load conditions cause only relatively small variations in the phase balance of the conversion system.

The effect of the inductance 151 in parallel with the capacitor 143 can be illustrated by considering operation of the circuit with a single motor connected to terminals A6, B6 and C6 to afford the three phase load 111. When the switch 115 is closed, there is a large initial current inrush, the effective impedance of the motor being relatively low. Under these conditions, only a relatively low lagging current passes through reactor 151, though there is a relatively high leading current through capacitor 143. As the effective impedance of the motor load builds up, however, there is a substantial increase in the current through the reactor 151. It can be demonstrated that this change in currents with changes in load conditions, and particularly the feeding of a variable lagging current to the load from reactor 151, operates to maintain phase converter circuit 110 in essentially balanced condition, with respect to the three phases of the load that it supplies, over a broad range of operating conditions.

In order to afford a more detailed disclosure of a typical converter system constructed in accordance with the invention, certain data are set forth hereinafter with respect to one converter system conforming to the system 110 illustrated in FIG. 6, together with performance data for the system. It should be understood that these data are presented merely by way of illustration and in no sense as a limitation on the invention.

Load 111 _____ 1 H.P., 3 phase, 60 cycle, 220 volts, 3.2 amperes, 1740 r.p.m., 40° C. rise.
Capacitor 143 _____ 240 microfarads, 330 volts A.C.

|  | Start | Full Load | No Load |
| --- | --- | --- | --- |
| Line voltage (volts) | 220 | 225 | 225 |
| Line current (amperes) | 20 | 5.25 | 2.9 |
| Voltage A6-B6 (volts) | 220 | 225 | 225 |
| Voltage A6-C6 (volts) | 220 | 230 | 210 |
| Voltage B6-C6 (volts) | 190 | 260 | 262 |
| Current, Capacitor 143 | 18.5 | 20 | 21 |
| Current, Inductor 151 | 1.35 | 15 | 17.5 |
| Current A6 (amperes) | 19 | 3.1 | 1.5 |
| Current B6 (amperes) | 19 | 2.75 | 2.5 |
| Current C6 (amperes) | 17 | 3.2 | 1.9 |

Starting torque _____ 8 foot pounds.
Full load torque _____ 1740 r.p.m., 3 foot pounds.
Breakdown (pull-in) torque _ 12 foot pounds.

FIG. 7 illustrates a further converter system 170 that is generally similar to the circuit 110 of FIG. 6 but that includes improved means for compensating for variations, either under-voltage, or over-voltage, in the single-phase supply. The converter system 170 is shown coupled to a three-phase load 171, which typically may include one or more individual three-phase motors. The load circuit 171 is provided with three input terminals A7, B7 and C7. As before, the converter system is supplied from a single phase power supply 172 having output terminals 173 and 174 and a main switch 175.

In the circuit of FIG. 7, the input terminal B7 of the three-phase load 171 is connected to one end of an iron core inductance by an adjustable tap 176. The circuit is shown with the tap member 176 connected to one of a series of several terminals 178 along the left-hand end of the inductance 177. The power supply terminal 173 is also connected by a tap member 179 to one of the plural end terminals 178 of the inductance 177; the connector 179 may be connected to the same terminal 178 as the connector 176 or to a different terminal as described more fully hereinafter. A de-phasing capacitor 183 is connected in parallel with the inductance 177, being connected to the left-hand terminal of the inductance and being connected through a variable tap 182 to the right-hand end of the inductance. The capacitor 183 is also connected to the input terminal C7 of the load circuit 171.

The remainder of the circuit is essentially similar to that of FIGS. 3 and 6. Thus, an iron core inductance comprising an autotransformer 194 is connected between the terminals C7 and A7. The end terminal of the lower winding section 198 of the autotransformer is directly connected to the terminal A7. A variable tap 195 connects the capacitor 183 and the terminal C7 to the upper winding section 197 of the autotransformer. As in the previous embodiments, the upper section 197 of the autotransformer winding is of substantially larger inductive impedance than the lower section 198. An adjustable tap 202 provides a return circuit from the junction of the winding sections 197 and 198 to the second power supply terminal 174.

The adjustment afforded by the terminals 178 and the adjustable taps 176 and 179 in the circuit 170 is used to compensate, in the converter system 170, for substantial variations in the voltage available from the power supply 172. With the connections illustrated, the inductance 177 affords a voltage boosting action. That is, assuming that the output voltage from the source 172 is approximately 200 volts or less and an operating voltage of 240 volts is required, the arrangement shown for the taps 176 and 179 is effective to provide a step-up in voltage through autotransformer action in the iron core inductance 177, affording adequate operating voltages across the three phase terminals A7, B7 and C7 of the load circuit 171.

To adjust the converter system 170 for an excessive voltage condition of the power supply 172, it is only necessary to change the relative positions of the taps 176 and 179. Thus, when the voltage from the supply 172 is too high, the tap 179 is moved to the terminal 178 that is located at the extreme left-hand end of the inductance 177. In addition, the tap 176 is moved to one of the terminals 178 to the right of its present position. In effect, the inductance 177 now functions as a step-down autotransformer and reduces the voltage supplied to the three-phase load 171 in comparison with the input voltage from the single-phase source 172. It is thus seen that the circuit of FIG. 7, while affording effectively balanced three-phase power over a broad range of load conditions, also serves to compensate for substantial variations in the available operating voltage from the single-phase supply 172.

Each of the several embodiments of the present invention provides for the energization of a three-phase motor, several such motors, or other three-phase load, from a single-phase power supply. In motor operation, the converter systems of the invention afford relatively high breakdown and pull-in torques. The operating efficiencies of the systems are relatively high. In all instances, the converters may be operated under substantial overload conditions without damage to the converter circuits or to the motors or other loads that they energize. The voltage ratings of the capacitors used may be approximately the same as or only slightly higher than the single-phase line voltages. In the embodiments of FIGS. 6 and 7, in particular, the converter systems are effective to handle substantially varying loads which may include a plurality of individual motors that are used simultaneously or at different times. Although relays have been illustrated as motor starting means in some embodiments of the invention, mechanical starting switches, centrifugal starting switches or other switching apparatus such as solid state semiconductor gate devices can be utilized in the converter systems for effectively connecting and disconnecting the starting capacitors in the operating circuits.

In FIGS. 6 and 7, as illustrated the converter circuits supply relatively high starting torque and are fully satisfactory in this regard for most applications. These circuits may be modified, however, to incorporate auxiliary starting capacitors such as the capacitors 71 and 101 of FIGS. 4 and 5, for applications in which very high starting torques for motor loads are required. It will apparent that the auxiliary capacitors employed for starting duty may be connected in the circuits of FIGS. 6 and 7 in the same manner as indicated in FIGS. 4 and 5 with appropriate switching devices for effectively disconnecting the starting capacitors when the motor loads reach running conditions. In those applications in which a plurality of motors are to be operated from the same converter system, and particularly where one such motor is substantially larger than the other motors of the composite load, the circuit connections may be made so that the control of the starting capacitor is responsive to the current drawn by the large motor and not to the small motors merely by incorporating the relay coil or other sensing device for controlling the switch to which the capacitor is connected in the circuit of the larger motor independently of the smaller motors. Inasmuch as these circuit modifications will be apparent from the several circuits illustrated and described hereinabove, they have not been specifically shown in the drawings.

Hence, while preferred embodiments of the invention have been described and illustrated, it is to be understood that they are capable of variation and modification.

I claim:

1. A converter system for energizing a three-phase load having three input terminals A, B and C from a single-phase power supply having two output terminals, said converter system comprising:
    means connecting a first one of said power supply output terminals to load terminal B;
    a dephasing capacitor connected across load terminals B and C;
    an iron core autotransformer having first and second winding sections connected together at a central terminal, the end terminals of said first and second winding sections being connected, respectively, to load terminals C and A, said first winding section having a substantially higher inductive reactance than said second winding section;
    and means connecting said central terminal of said autotransformer to the other power supply output terminal.

2. A converter system as set forth in claim 1 in which said first and second winding sections are wound on the autotransformer core in bucking relation to each other, with respect to said single-phase power supply, and in which the effective inductance of said first winding section is adjustable to balance the currents and voltages between said load terminals at full load and overload conditions.

3. A converter system for energizing a three-phase motor having three input terminals A, B and C from a single-phase power supply having two output terminals, said converter system comprising:
    means connecting a first one of said power supply output terminals to motor terminal B;
    an iron-core autotransformer having first and second winding sections wound in bucking relation to each other and connected together at a central terminal, the end terminals of said first and second winding sections being connected, respectively, to motor terminals C and A, said first winding section having a substantially higher inductive reactance than said second winding section;
    means connecting said central terminal of said autotransformer to the other power supply output terminal;
    a first dephasing capacitor connected in series between said second power supply terminal and motor terminal C;
    a second dephasing capacitor connected in parallel with said first capacitor;
    a control relay having a pair of normally open contacts interposed in series circuit relation with said second capacitor and having an operating coil connected to said power supply;
    and a voltage-sensitive pilot relay, having a pair of normally-closed contacts connected in series with the operating coil of said control relay and having an operating coil connected across one pair of motor terminals, for effectively disconnecting said second capacitor from the converter circuit in response to an increase in internal voltage of the motor occurring as an incident to the motor approaching operating speed, thereby limiting use of said second capacitor to starting conditions.

4. A converter system for energizing a three-phase motor having three input terminals A, B and C from a single-phase power supply having two output terminals, said converter system comprising:
    means connecting a first one of said power supply output terminals to motor terminal B;
    an iron-core autotransformer having first and second winding sections wound in bucking relation to each other and connected together at a central terminal, the end terminals of said first and second winding sections being connected, respectively, to motor terminals C and A, said first winding section having a substantially higher inductive reactance than said second winding section;
    means connecting said central terminal of said autotransformer to the other power supply output terminal;
    a first dephasing capacitor connected in series between said first power supply terminal and motor terminal C;
    a second dephasing capacitor connected in parallel with said first capacitor;
    and normally open relay means, connected in series with said second capacitor, for effectively disconnecting said second capacitor from the converter circuit under normal motor operating conditions, said relay means being responsive to the inrush of starting current to said motor to complete an operating circuit for said second capacitor for starting conditions only.

5. A converter system for energizing a three-phase load having three input terminals A, B and C from a single-phase power supply having first and second output terminals, said converter system comprising:
    means connecting said first power supply output terminal to load terminal B;
    a de-phasing capacitor connected across load terminals B and C;
    an iron-core autotransformer comprising first and second winding sections connected in series at a common central terminal, the end terminals of the first and second winding sections being connected, respectively, to load terminals C and A, said first winding section having a substantially higher inductive reactance than said second winding terminal;
    means connecting said central terminal of said autotransformer to said second power supply output terminal;
    and a balancing inductor connected in parallel with said de-phasing capacitor.

6. A converter system according to claim 5 in which said balancing inductor is provided with adjustment means for adjusting the effective inductance in parallel with said de-phasing capacitor to accommodate varying input voltage conditions.

7. A converter system according to claim 5 in which said autotransformer winding sections are constructed as a continuous winding and in which said common central terminal is afforded by an adjustable tap on said winding for varying the relative reactances of said first and second winding sections.

8. A converter system according to claim 5 in which said balancing inductor comprises a second iron-core autotransformer having first and second winding sections connected in series with each other at a common central terminal, with said first winding section having a substantially larger inductive reactance than said second winding section, the connection from said first power supply terminal to said load terminal B being made through said second winding section of said second iron-core autotransformer.

9. A converter system according to claim 5 in which said balancing inductor has an inductive reactance, at the operating frequency of said power supply, approximately equal to the capacitive reactance of said re-phasing capacitor to provide a parallel-resonant tank circuit between load terminals B and C.

10. A converter system for energizing a three-phase load having three input terminals A, B and C from a single-phase A.C. power supply having first and second output terminals, said converter system comprising:
  means connecting said first power supply output terminal to load terminal B;
  a de-phasing capacitor connected across load terminals B and C;
  a first current-balancing inductor comprising an iron-core inductance having a relatively high reactance/resistance ratio, connected between load terminals A and C;
  means connecting said second power supply output terminal to load terminal A;
  and a second current-balancing inductor connected in parallel with said de-phasing capacitor, said second inductor having an inductive reactance of the same order of magnitude as the capacitive reactance of said de-phasing capacitor at the operating frequency of said power supply.

11. A converter system for energizing a three-phase load having three input terminals A, B and C from a single-phase A.C. power supply having first and second output terminals, said converter system comprising:
  a first current-balancing inductor comprising an iron-core inductance having a relatively high reactance/resistance ratio, connected between load terminals A and C;
  means for connecting said second power supply output terminal to load terminal A;
  a de-phasing capacitor connected to load terminal C;
  a second current-balancing inductor comprising an inductance coil connected in a parallel circuit with said de-phasing capacitor, said second inductor having an inductive reactance of the same order of magnitude as the capacitive reactance of said de-phasing capacitor at the operating frequency of said power supply;
  and adjustable connecting means for individually connecting said first power supply output terminal and said load terminal B to said second current-balancing inductor at any one of a plurality of points along a limited portion of said coil at the end of said coil remote from said load terminal C, adjustment of said connecting means enabling compensation of said system for overvoltage and undervoltage conditions of said single-phase power supply.

12. A converter system according to claim 11 in which said first current-balancing inductor comprising a first winding section of an iron-core autotransformer having a second winding section having one end connected at a common terminal to said first winding section and the other end thereof connected to motor terminal A, said means connecting the other power supply output terminal to motor terminal A comprising a connection from the common terminal of the autotransformer to said other power supply terminal.

13. A converter system according to claim 11 in which said adjustable connecting means comprises separate first and second connectors connecting said first power supply output terminal and said load terminal B, respectively, to said points on said coil, said connectors being independently connectable to the same or different points on said coil.

14. A converter system for energizing a three-phase motor having three input terminals A, B and C from a single-phase power supply having two output terminals, said converter system comprising:
  means connecting a first one of said power supply output terminals to motor terminal B;
  a current-balancing inductance having a relatively high reactance-resistance ratio connected in parallel with motor terminals A and C, said inductance comprising a first winding section of an iron-core autotransformer having a second winding section having one end connected at a common terminal to said first winding section and the other end thereof connected to motor terminal A;
  means connecting the other power supply output terminal to motor terminal A, comprising a conductive connection from said common terminal of said autotransformer to said other power supply output terminal;
  a first de-phasing capacitor connected between motor terminals B and C;
  a second de-phasing capacitor connected between motor terminals B and C;
  and switching means, connected to said second capacitor, for opening the operating circuit thereof in response to predetermined changes in the operating conditions of the motor to thereby restrict use of the second capacitor to starting of the motor.

References Cited by the Examiner

UNITED STATES PATENTS

| | | | |
|---|---|---|---|
| 620,988 | 3/99 | Steinmetz | 318—220 |
| 1,973,010 | 9/34 | Morrison | 318—220 |
| 2,832,925 | 4/58 | Koll | 318—221 |

JOHN F. COUCH, *Primary Examiner.*

ORIS L. RADER, *Examiner.*